(12) United States Patent
Kim

(10) Patent No.: US 11,557,201 B2
(45) Date of Patent: Jan. 17, 2023

(54) APPARATUS FOR ASSISTING DRIVING OF A HOST VEHICLE BASED ON AUGMENTED REALITY AND METHOD THEREOF

(71) Applicant: HL KLEMOVE CORP., Incheon (KR)

(72) Inventor: Byung-Joo Kim, Gyeonggi-do (KR)

(73) Assignee: HL KLEMOVE CORP., Incheon (KR)

( * ) Notice: Subject to any disclaimer, the term of this patent is extended or adjusted under 35 U.S.C. 154(b) by 224 days.

(21) Appl. No.: 16/899,496

(22) Filed: Jun. 11, 2020

(65) Prior Publication Data

US 2020/0394906 A1 Dec. 17, 2020

(30) Foreign Application Priority Data

Jun. 13, 2019 (KR) ........................ 10-2019-0069983

(51) Int. Cl.

| G06T 11/60 | (2006.01) |
| G08G 1/01 | (2006.01) |
| H04W 4/40 | (2018.01) |
| G06T 3/40 | (2006.01) |
| G06T 19/00 | (2011.01) |
| G06V 20/20 | (2022.01) |
| G06V 20/56 | (2022.01) |

(52) U.S. Cl.
CPC ......... *G08G 1/0141* (2013.01); *G06T 3/4038* (2013.01); *G06T 11/60* (2013.01); *G06T 19/006* (2013.01); *G06V 20/20* (2022.01); *G06V 20/56* (2022.01); *G08G 1/0112* (2013.01); *H04W 4/40* (2018.02)

(58) Field of Classification Search
None
See application file for complete search history.

(56) References Cited

U.S. PATENT DOCUMENTS

| 2018/0004204 A1* | 1/2018 | Rider | B60K 35/00 |
| 2019/0004533 A1* | 1/2019 | Huang | H04N 5/2258 |
| 2019/0362473 A1* | 11/2019 | Scott | H04W 4/021 |

FOREIGN PATENT DOCUMENTS

KR 10-2012-0105761 9/2012

* cited by examiner

*Primary Examiner* — Yi Wang
(74) *Attorney, Agent, or Firm* — Ladas & Parry, LLP

(57) ABSTRACT

An apparatus for assisting driving of a host vehicle based on augmented reality and a method thereof are provided. The apparatus for assisting driving of a host vehicle based on augmented reality includes an image sensor configured to capture an image of surroundings of the host vehicle, and a controller communicatively connected to the image sensor. The controller is configured to transmit the captured image to a cloud server through a wireless communicator, determine whether information about the captured image is lost due to the other vehicle neighboring the host vehicle, receive a panoramic image of a corresponding location from the cloud server through the wireless communicator if the information of the captured image is lost, process the received panoramic image in combination with the image, the information of which is lost, so as to generate an augmented-reality image, and perform autonomous driving according to the augmented-reality image or display the augmented-reality image on a display.

20 Claims, 7 Drawing Sheets

APPARATUS FOR ASSISTING DRIVING OF A HOST VEHICLE BASED ON AUGMENTED REALITY AND METHOD THEREOF

CROSS-REFERENCE TO RELATED APPLICATION

This application claims priority to and the benefit of Korean Patent Application No. 2019-0069983, filed on Jun. 13, 2019, the disclosure of which is incorporated herein by reference in its entirety.

BACKGROUND

1. Field of the Invention

The present disclosure relates to an apparatus for assisting driving of a host vehicle based on augmented reality and a method thereof.

2. Discussion of Related Art

In general, autonomous vehicles use various types of sensors to collect data about surroundings while driving. For example, an autonomous vehicle determines a driving route based on data of surroundings on the basis of images captured by an image sensor and position data detected by a position sensor such as a LiDAR sensor or a radar sensor. Here, the position data refers to position data about objects near the autonomous vehicle.

However, when many vehicles are crowded together, data to be detected may be limited due to neighboring vehicles. Therefore, a method of solving limitations of data detection caused by neighboring vehicles is required.

SUMMARY OF THE INVENTION

To address the problems of the related art as described above, embodiments of the present disclosure are directed to an apparatus for assisting driving of a host vehicle based on augmented reality, which is capable of detecting accurate data using a panoramic image of a corresponding location provided from a cloud server even when detected data is limited due to clustered neighboring vehicles or night or bad weather, and a method thereof.

According to an aspect of the present disclosure, an apparatus for assisting driving of a host vehicle based on augmented reality includes an image sensor configured to capture an image of surroundings of the host vehicle and a controller communicatively connected to the image sensor and configured to: transmit the captured image to a cloud server through a wireless communicator; determine whether information about the captured image is lost due to another vehicle neighboring the host vehicle; receive a panoramic image of a corresponding location from the cloud server through the wireless communicator, if the information of the captured image is lost; process the received panoramic image in combination with the image of which the information is lost, so as to generate an augmented-reality image; and perform autonomous driving according to the augmented-reality image or display the augmented-reality image on a display.

In one embodiment, the apparatus may further include a position sensor configured to detect a position of an object near the host vehicle, and the controller may be further configured to: transmit detected position data to the cloud server through the wireless communicator, determine whether information of the detected position data is lost due to the other vehicle, and request the cloud server to provide the panoramic image of the location through the wireless communicator, if the information of the detected position data is lost.

In one embodiment, the position sensor may include at least one of a camera sensor, a LiDAR sensor, an ultrasonic sensor, or a radar sensor.

In one embodiment, the image sensor may include at least one of a camera sensor or a LiDAR sensor.

In one embodiment, the controller may be further configured to determine whether a current condition is night or bad weather, based on the captured image and request the cloud server to provide the panoramic image of the location through the wireless communicator if the current condition is night or bad weather.

In one embodiment, the controller may be further configured to generate the augmented-reality image such that the image, the information of which is lost, is combined in a perspective manner based on the panoramic image.

In one embodiment, the panoramic image may be based on images currently transmitted from the host vehicle and the other vehicle.

In one embodiment, the panoramic image may be based on images transmitted from vehicles passing the location during daytime or on an ordinary day.

According to another aspect of the present disclosure, a method of assisting driving of a host vehicle based on augmented reality includes capturing an image of surroundings of a host vehicle by an image sensor; transmitting the captured image to a cloud server through a wireless communicator by using a controller communicatively connected to the image sensor; determining, by the controller, whether information about the captured image is lost due to another vehicle neighboring the host vehicle; receiving, by the controller, a panoramic image of a corresponding location from the cloud server through the wireless communicator, if the information about the captured image is lost; processing, by the controller, the received panoramic image in combination with the image, the information of which is lost, so as to generate an augmented-reality image; and performing, by the controller, autonomous driving according to the augmented-reality image or display the augmented-reality image on a display.

In one embodiment, the method may further include detecting a position of an object near the host vehicle by a position sensor. The transmitting of the captured image may include transmitting detected position data to the cloud server. The determining of whether the information about the captured image is lost may include determining whether information of the detected position data is lost due to the other vehicle. If the information of the detected position data is lost, the receiving of the panoramic image may include requesting the cloud server to provide the panoramic image of the location.

In one embodiment, the position sensor may include at least one of a camera sensor, a LiDAR sensor, an ultrasonic sensor, or a radar sensor.

In one embodiment, the image sensor may include at least one of a camera sensor or a LiDAR sensor.

In one embodiment, the method may further include determining, by the controller, whether a current condition is night or bad weather based on the captured image; and requesting, by the controller, the cloud server to provide the panoramic image of the location through the wireless communicator, if the current condition is night or bad weather.

In one embodiment, the processing of the received panoramic image may include generating the augmented-reality image such that the image, the information of which is lost, is combined in a perspective manner based on the panoramic image.

In one embodiment, the panoramic image may be based on images currently transmitted from the host vehicle and the other vehicle.

In one embodiment, the panoramic image may be based on images transmitted from vehicles passing the location during daytime or on an ordinary day.

According to another aspect of the present disclosure, there is provided a non-transitory computer-readable medium storing computer-executable instructions, when executed by a processor, to perform operations of: capturing an image of surroundings of a host vehicle by an image sensor; transmitting the captured image to a cloud server through a wireless communicator; determining whether information about the captured image is lost due to another vehicle neighboring the host vehicle; receiving a panoramic image of a corresponding location from the cloud server through the wireless communicator, if the information about the captured image is lost; processing the received panoramic image in combination with the image, the information of which is lost, so as to generate an augmented-reality image; and performing autonomous driving according to the augmented-reality image or displaying the augmented-reality image on a display.

In one embodiment, the operations may further include detecting a position of an object near the host vehicle by a position sensor. The operation of transmitting the captured image may include transmitting detected position data to the cloud server. The operation of determining of whether the information about the captured image is lost may include determining whether information of the detected position data is lost due to the other vehicle. If the information of the detected position data is lost, the operation of receiving of the panoramic image may include requesting the cloud server to provide the panoramic image of the location In one embodiment, the operations may further include determining whether a current condition is night or bad weather based on the captured image; and requesting the cloud server to provide the panoramic image of the location through the wireless communicator, if the current condition is night or bad weather.

In one embodiment, the operation of processing the received panoramic image may include generating the augmented-reality image such that the image, the information of which is lost, is combined in a perspective manner based on the panoramic image.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
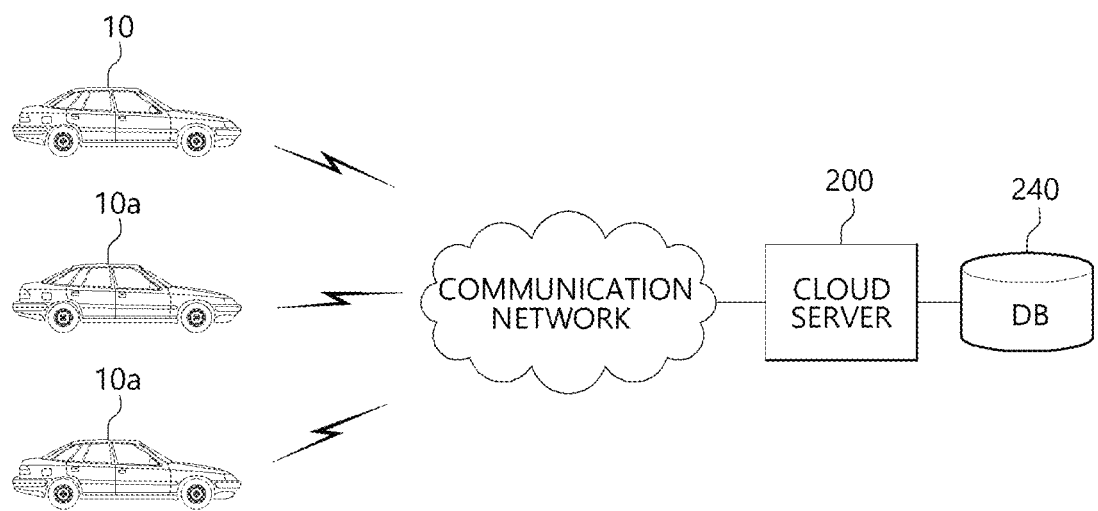
FIG. 1 is a schematic diagram illustrating a configuration of each vehicle equipped with an apparatus for assisting driving of a host vehicle based on augmented reality and a configuration of a cloud server according to an embodiment of the present disclosure.

Hereinafter, embodiments of the present disclosure will be described in detail with reference to the accompanying drawings below so that they may be easily implemented by those of ordinary skill in the art. However, the present disclosure may be embodied in many different forms and is not limited to the embodiments set forth herein. For clarity, parts not related to explaining the present disclosure are omitted in the drawings, and the same reference numerals are allocated to the same or like components throughout the specification.

Embodiments of the present disclosure are provided below to more fully describe the present disclosure to those of ordinary skill in the art and may be embodied in many different forms but the scope of the present disclosure is not limited thereto. Rather, these embodiments are provided so that the present disclosure will be thorough and complete and will fully convey the concept of the present disclosure to those of ordinary skill in the art.

The terms used herein are for the purpose of describing embodiments only and are not intended to be limiting of the present disclosure. As used herein, singular forms may include plural forms unless the context clearly indicates otherwise. As used herein, the terms "comprises" and/or "comprising" specify the presence of stated shapes, integers, steps, operations, members, elements and/or groups thereof but do not preclude the presence or addition of one or more other shapes, integers, steps, operations, members, elements and/or groups thereof. As used herein, the term "and/or" includes any and all combinations of one or more of the listed items.

Although the terms first, second, etc. are used herein to describe various members, regions, and/or parts, it will be obvious that these members, parts, regions, layers, and/or parts are not limited by these terms. These terms do not imply a specific order, top or bottom, or superiority or inferiority and are only used to distinguish one member, region or part from another. Accordingly, a first member, region, or part described below may refer to a second member, region, or part without departing from the teachings of the present disclosure.

In the present specification, terms such as "or" and "at least one" may refer to one of terms listed together or a combination of two or more of them. For example, the expression "A or B" and "at least one of A or B" indicates only A, only B, or both A and B.

Hereinafter, embodiments of the present disclosure will be described with reference to the accompanying drawings schematically illustrating the embodiments of the present disclosure. It will be expected that shapes of components illustrated in the drawings may vary, for example, according to manufacturing technology and/or tolerances. Therefore, the embodiments of the present disclosure should not be construed as being limited by a specific shape of each region illustrated in the present specification but should be understood to cover, for example, a change in the shape of each region, caused during a manufacture process.

Figure 2:
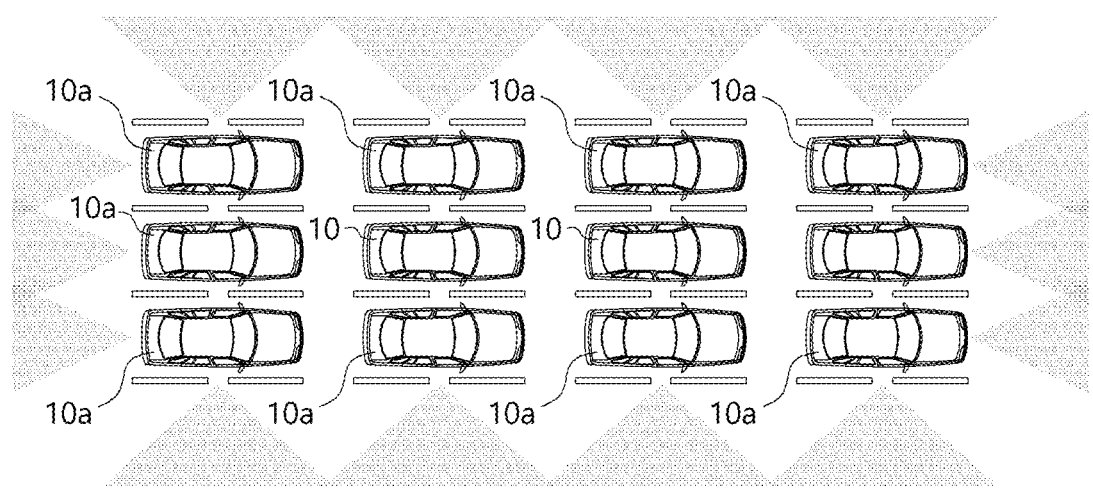
FIG. 2 is a diagram for describing a state in which detected data is limited due to clustering of the vehicles of FIG. 1.

FIG. 1 is a schematic diagram illustrating a configuration of each vehicle equipped with an apparatus for assisting driving of a host vehicle based on augmented reality and a configuration of a cloud server according to an embodiment of the present disclosure. FIG. 2 is a diagram for describing a state in which detected data is limited due to clustering of the vehicles of FIG. 1.

Referring to FIG. 1, a vehicle 10 equipped with the apparatus for assisting driving of a host vehicle based on augmented reality according to the embodiment of the present disclosure may communicate with a cloud server 200 through a communication network. In this case, a plurality of vehicles 10 may simultaneously transmit data of surroundings detected thereby to the cloud server 200.

Therefore, the cloud server 200 may receive the detected data from the plurality of vehicles 10. In particular, the cloud server 200 may generate a panoramic image of a corresponding location based on images transmitted from the plurality of vehicles 10.

Here, the vehicle 10 may be an autonomous vehicle. In this case, the vehicle 10 may detect data of the surroundings using a plurality of sensors and determine a driving route based on the detected data.

Referring to FIG. 2, when a large number of vehicles 10 are crowded on the road, data to be detected is limited. That is, when a host vehicle 10 is surrounded by a plurality of other vehicles 10a, an area to be detected by a sensor is limited. In this case, information about an area detected by the sensor may be lost.

As illustrated in FIG. 2, when there are other vehicles 10a neighboring the host vehicle 10 in front, rear, left, and right directions, a field of view of an image sensor of the host vehicle 10 is limited due to the neighboring other vehicles 10a and thus an image of the surroundings of the host vehicle 10 may not be accurately captured normally. In addition, because a line of sight (LOS) of a position sensor of the host vehicle 10 is limited due to the neighboring other vehicle 10a, position data of objects near the host vehicle 10 is not accurately detected normally.

According to the present disclosure, a panoramic image of a corresponding location is provided from the cloud server 200 to the host vehicle 10, and the vehicle 10 generates an augmented-reality image by combining the panoramic image of the location with data detected currently by a sensor.

Here, the panoramic image may be an image that is not limited. That is, the panoramic image may be a complete image, the information of which is not lost and which contains information about the surroundings. For example, the panoramic image may consist of images captured from outer vehicles 10a among a group of clustered vehicles as illustrated in FIG. 2. Alternatively, the panoramic image may consist of either mages other than images from the other vehicles 10a or high-definition images.

Accordingly, according to the present disclosure, data limited due to neighboring other vehicles or night or bad weather may be accurately detected, thereby ensuring safe driving.

Figure 3:
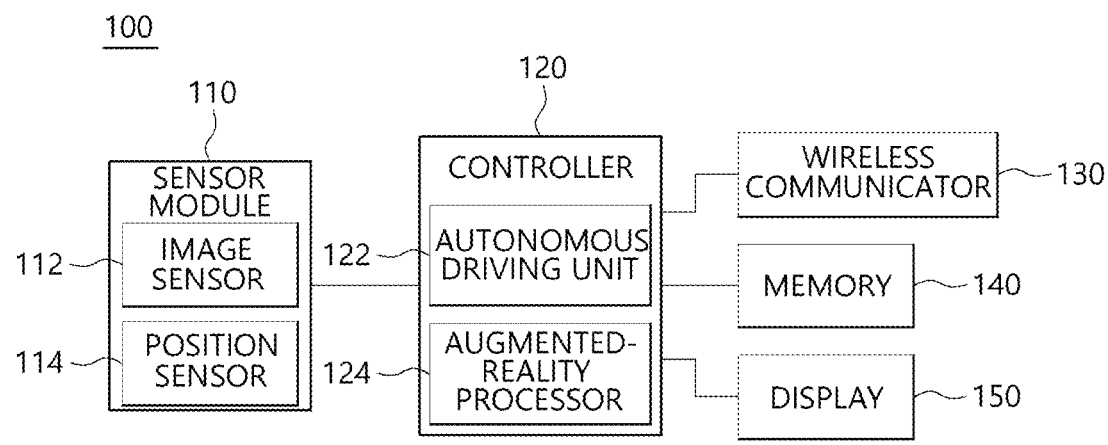
FIG. 3 is a block diagram of an apparatus for assisting driving of a host vehicle based on augmented reality according to an embodiment of the present disclosure.

FIG. 3 is a block diagram of an apparatus for assisting driving of a host vehicle based on augmented reality according to an embodiment of the present disclosure.

Referring to FIG. 3, an apparatus 100 for assisting driving of a host vehicle based on augmented reality includes a sensor module 110 and a controller 120.

The sensor module 110 may be included in a host vehicle 10 to capture or detect data about surroundings of the host vehicle 10. The sensor module 110 may include an image sensor 112 and a position sensor 114.

The image sensor 112 captures an image of the surroundings of the host vehicle 10. The image sensor 112 may include at least one of a camera sensor or a LiDAR sensor.

The position sensor 114 may detect a position of an object near the host vehicle 10. The position sensor 114 may include at least one of a camera sensor, a LiDAR sensor, an ultrasonic sensor, or a radar sensor.

The controller 120 is communicatively connected to the sensor module 110. That is, the controller 120 may be communicatively connected to the image sensor 112 and the position sensor 114. Here, the controller 120 may include an autonomous driving unit 122 and an augmented-reality processor 124.

The autonomous driving unit 122 may be configured to control driving of the host vehicle 10. Here, the autonomous driving unit 122 may be configured to control driving of the host vehicle 10 based on data captured or detected from the sensor module 110, data about a destination, current position data, and the like.

The augmented-reality processor 124 may be configured to transmit an image captured by the image sensor 112 to the cloud server 200 through a wireless communicator 130. Here, the augmented-reality processor 124 may be configured to transmit an image of a current location to the cloud server 200 so that a panoramic image may be generated by the cloud server 200. In this case, the augmented-reality processor 124 may also transmit current position data of the host vehicle 10.

Alternatively, the augmented-reality processor 124 may be configured to transmit position data detected by the position sensor 114 to the cloud server 200 through the wireless communicator 130. Here, the augmented-reality processor 124 may be configured to transmit position data of an object near the host vehicle 10 to the cloud server 200.

In addition, the augmented-reality processor 124 may be configured to determine whether an image captured by the image sensor 112 is limited due to another vehicle 10a neighboring the host vehicle 10. For example, when a shape of the other vehicle 10a is included in an captured image, the augmented-reality processor 124 may determine that the image is limited.

In the present specification, determining whether an captured image is limited may be understood to mean determining whether information about the captured image is lost due to a neighboring vehicle.

In addition, the augmented-reality processor 124 may be configured to request the cloud server 200 to provide a panoramic image of a corresponding location and receive the panoramic image from the cloud server 200 through the wireless communicator 130 when the captured image is limited.

In the present specification, a limited image refers to an image, the information of which is partially lost due to a neighboring vehicle.

Alternatively, the augmented-reality processor 124 may be configured to determine whether position data detected by the position sensor 114 is limited due to another vehicle 10a. For example, when the detected position data indicates that there is an object within a short distance from the host vehicle 10, the augmented-reality processor 124 may determine that the position data is limited.

When the detected position data is limited, the augmented-reality processor 124 may be configured to request the cloud server 200 to provide a panoramic image 244 of a corresponding location and receive the panoramic image 244 from the cloud server 200 through the wireless communicator 130.

In addition, the augmented-reality processor 124 may be configured to determine whether a current condition is night or bad weather. In this case, the augmented-reality processor 124 may determine whether the current condition is night or bad weather based on an image captured by the image sensor 112. For example, the augmented-reality processor 124 may determine that the current condition is night when the brightness of the image is less than a certain value. In addition, the augmented-reality processor 124 may determine that the current condition is bad weather when the definition of the image is less than a certain value due to snow, rain, or fog.

Alternatively, the augmented-reality processor 124 may determine whether the current condition is night by using an illumination sensor and determine whether the current condition is bad weather by using components operated in the host vehicle 10 during bad weather. For example, the augmented-reality processor 124 may determine whether the current condition is bad weather according to whether wipers are driven or whether a fog light is driven.

In this case, in case of night or bad weather, the augmented-reality processor 124 may be configured to request the cloud server 200 to provide a panoramic image of a corresponding location and receive the panoramic image from the cloud server 200 through the wireless communicator 130.

In addition, the augmented-reality processor 124 may be configured to process the panoramic image received from the cloud server 200 in combination with the limited image so as to generate an augmented-reality image. For example, the augmented-reality processor 124 may extract part of the panoramic image, which corresponds to the current location and is received from the cloud server 200, corresponding to the image captured by the image sensor 112 and use the extracted part as a basic image. Here, the panoramic image refers to an image which is not limited with respect to the corresponding location.

In this case, the augmented-reality processor 124 may be configured to generate an augmented-reality image such that the limited image is combined in a perspective manner based on the panoramic image.

As described above, a part of the surroundings of which a viewpoint is limited by the other vehicle 10a may be displayed as a panoramic image, and in addition, the limited image, i.e., an image of the other vehicle 10a, may be displayed as a transparent image in augmented reality.

In addition, the augmented-reality processor 124 may be configured to use the generated augmented-reality image for autonomous driving or display the generated augmented-reality image. For example, the augmented-reality processor 124 may provide the autonomous driving unit 122 with the generated augmented-reality image as a currently captured image to be used for autonomous driving. In addition, the augmented-reality processor 124 may be configured to display the generated augmented-reality image on a display 150.

The apparatus 100 may further include a wireless communicator 130, a memory 140, and the display 150.

The wireless communicator 130 may be configured to communicate with the cloud server 200 through a communication network. Here, the communication network may be a public communication network such as a cellular network. That is, the wireless communicator 130 may be configured to establish communication which allows access to a public communication network.

The memory 140 may be configured to store data captured or detected by the sensor module 110. In addition, the memory 140 may be configured to store a panoramic image transmitted from the cloud server 200.

The display 150 may be configured to display an image captured by the image sensor 112. In addition, the display 150 may be configured to display a panoramic image generated by the augmented-reality processor 124. For example, the display 150 may be a display of a navigation system provided in the host vehicle 10.

Figure 4:
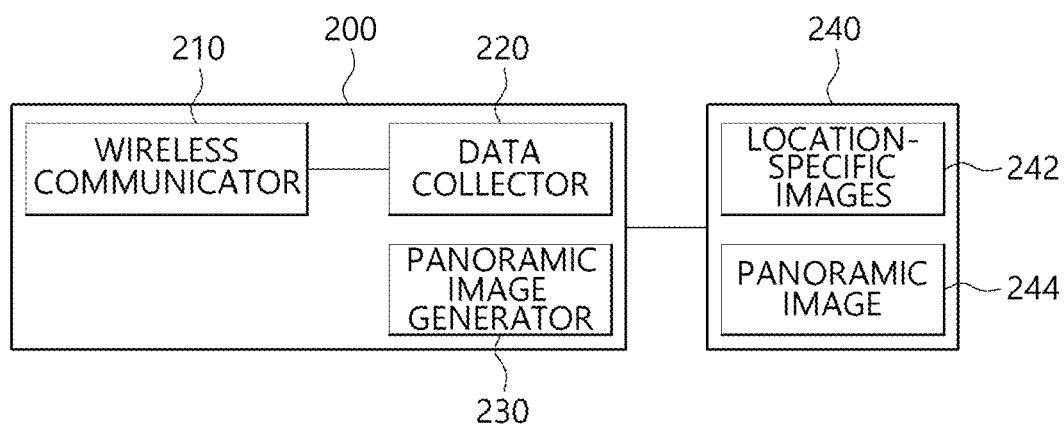
FIG. 4 is a block diagram of the cloud server of FIG. 1.

FIG. 4 is a block diagram of the cloud server 200 of FIG. 1.

Referring to FIG. 4, the cloud server 200 may be configured to receive and manage images or position data transmitted from vehicle 10. The cloud server 200 may include a wireless communicator 210, a data collector 220, a panoramic image generator 230, and a database 240.

The wireless communicator 210 may be configured to communicate with the vehicle 10 through a communication network. Here, the communication network may be a public communication network such as a cellular network. That is, the wireless communicator 210 may be configured to establish communication which allows access to a public communication network.

The data collector 220 may be configured to manage images or position data transmitted from the vehicles 10 by storing the images and the position data in the database 240. Here, the data collector 220 may store the images or pieces of position data, which are transmitted from the vehicles 10, according to location. In this case, the data collector 220 may store and manage the images or the position data only when the images or the position data are not limited.

The panoramic image generator 230 may be configured to generate a panoramic image of a corresponding location based on the images stored according to the locations by the data collector 220. Here, the panoramic image may include a larger area than areas of the images transmitted from the vehicles 10.

For example, the panoramic image generator 230 may generate a panoramic image by combining a plurality of images according to locations. That is, the panoramic image may be formed by combining three to ten images among the images transmitted from the vehicles 10.

In this case, the panoramic image may be generated based on images currently transmitted from the host vehicle 10 and another vehicle 10a. That is, the panoramic image may be generated based on images transmitted from the host vehicle 10 and the other vehicle 10a which currently drive through a corresponding location. For example, the panoramic image generator 230 may generate a panoramic image by selecting a plurality of images from among images currently collected by the data collector 220.

Here, the panoramic image generator 230 may generate a panoramic image from only images that are not limited among the images transmitted from the host vehicle 10 and the other vehicle 10a. In this case, the images that are not limited refer to images of which a viewpoint is not limited by the other vehicle 10a. For example, the images that are not limited may be images captured from outer vehicles 10*a* among a group of clustered vehicles as illustrated in FIG. 2.

Alternatively, the panoramic image may be generated based on images transmitted from vehicles 10 passing the corresponding location during daytime or on an ordinary day. Here, the ordinary day refers to a period of time, e.g., clear weather, when an captured image can be clearly interpreted, and may be defined as a period of time opposite to bad weather. In other words, the panoramic image may be generated based on images transmitted from a vehicle 10 driving through the corresponding location at an earlier point in time. For example, the panoramic image generator 230 may generate a panoramic image by selecting a plurality of images according to locations by searching location-specific images 242 with respect to a current location.

Here, the panoramic image generator 230 may generate a panoramic image from only images that are not limited among the images transmitted from the vehicle 10. In this case, the images that are not limited refer to images of which a viewpoint is not limited by the vehicle 10*a*. For example, the images that are not limited may be either images that are images excluding the other vehicle 10*a* or high-definition images.

The database 240 may be configured to include the location-specific images 242 and the panoramic image 244.

The location-specific images 242 may be images processed by the data collector 220. Here, the location-specific images 242 may be images that are not limited. That is, the location-specific images 242 may not include images of the vehicle 10.

The panoramic image 244 may be a location-specific panoramic image generated by the panoramic image generator 230. Here, the panoramic image 244 may be a combination of a plurality of images among the location-specific images 242.

Figure 5:
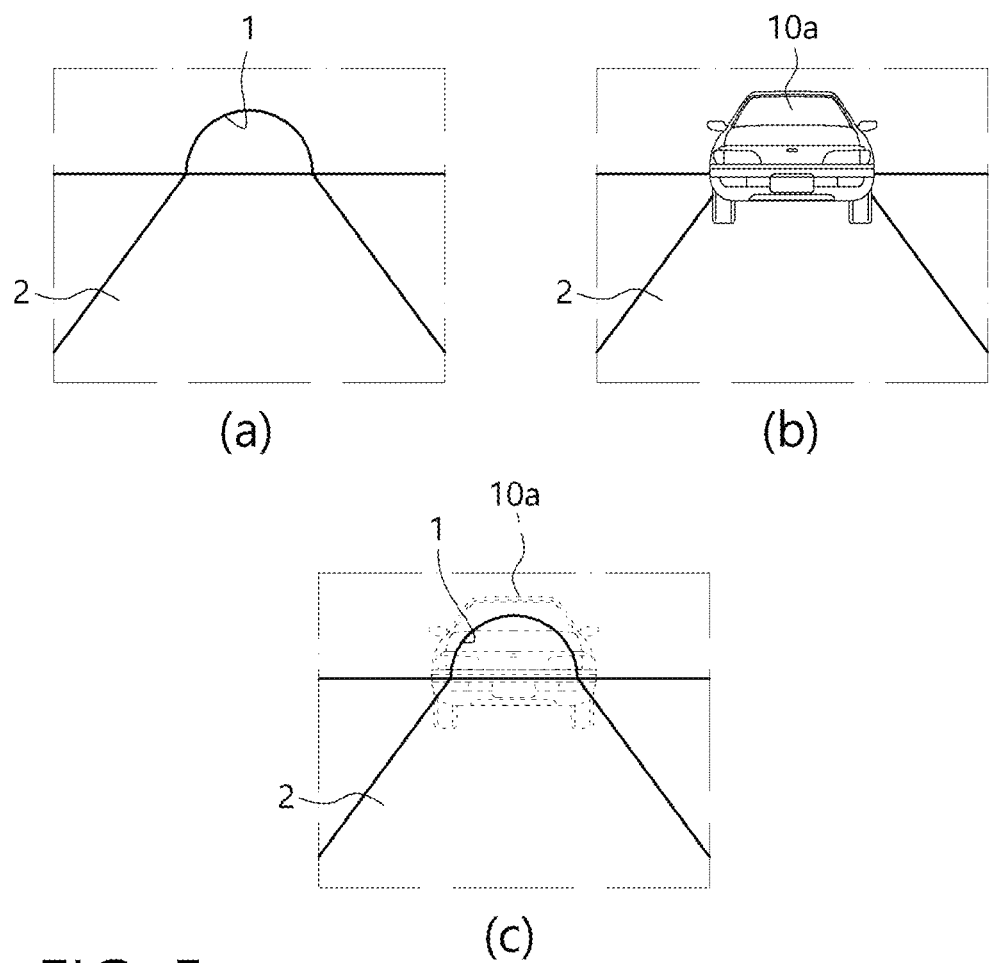
FIG. 5 illustrates an example of an augmented-reality image generated by an apparatus for assisting driving of a host vehicle based on augmented reality according to an embodiment of the present disclosure.

FIG. 5 illustrates an example of an augmented-reality image generated by an apparatus for assisting driving of a host vehicle based on augmented reality according to an embodiment of the present disclosure.

FIG. 5A illustrates the panoramic image 244 which is an image of a corresponding location and is generated by the cloud server 200. FIG. 5B is a limited image of the corresponding location which is captured by the host vehicle 10. FIG. 5C is an augmented-reality image generated by transparently combining the limited image based on the panoramic image 244.

As illustrated in FIG. 5A, a case in which the host vehicle 10 is driving on the road 2 while facing a tunnel 1 in a front direction will be described below.

In this case, as illustrated in FIG. 5B, when another vehicle 10*a* is located in front of the host vehicle 10 on the road 2, the image captured by the host vehicle 10 may be a limited image in which the tunnel 1 is hidden by the other vehicle 10*a*.

As illustrated in FIG. 5C, the augmented-reality image may be generated by combining the limited image in a perspective manner based on the panoramic image 244. For example, the tunnel 1 hidden by the other vehicle 10*a* may be displayed by a solid line and the other vehicle 10*a* may be displayed by a dotted line or transparently.

Due to the above configuration, the apparatus for assisting driving of a host vehicle based on augmented reality according to the embodiment of the present disclosure is capable of accurately detecting data limited due to a neighboring vehicle or night or bad weather, thereby ensuring safe driving.

Figure 6:
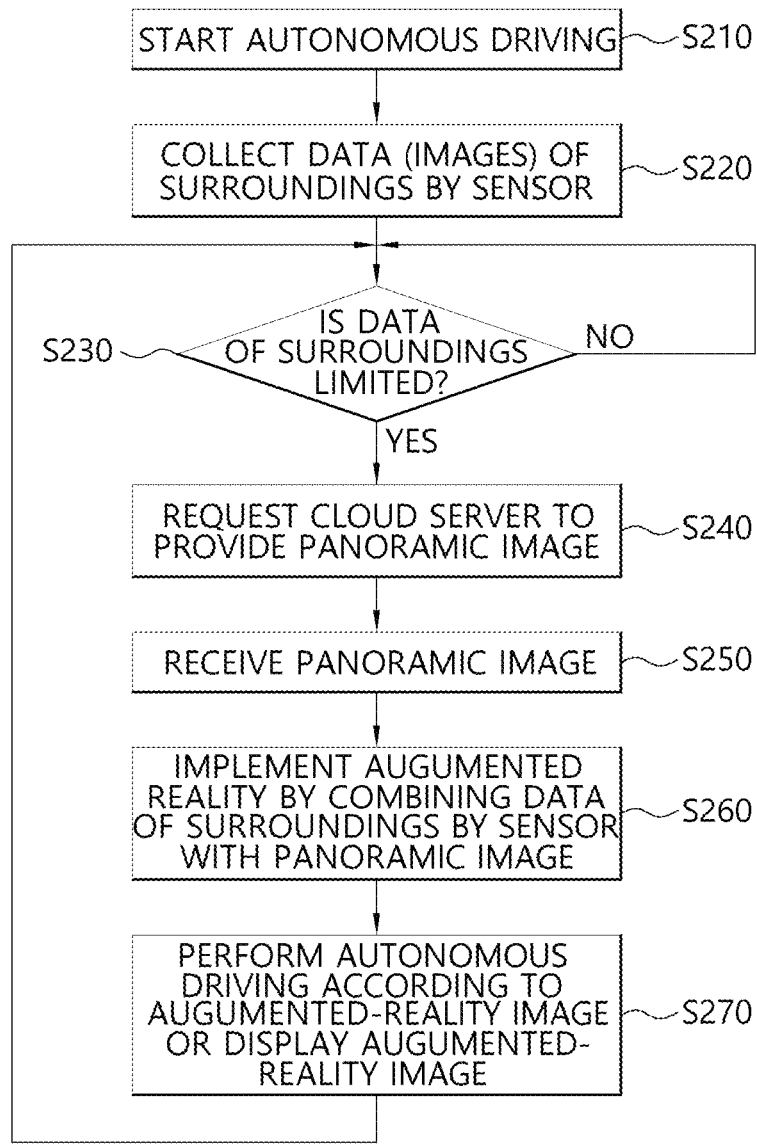
FIG. 6 is a flowchart of an example of a method of assisting driving of a host vehicle based on augmented reality according to an embodiment of the present disclosure.

Methods of assisting driving of a host vehicle based on augmented reality according to the present disclosure will be described with reference to FIGS. 6 and 7 below. FIG. 6 is a flowchart of an example of a method of assisting driving of a host vehicle based on augmented reality according to an embodiment of the present disclosure.

A method 200 of assisting driving of a host vehicle based on augmented reality includes starting autonomous driving (S210), collecting data (S220), determining whether data of surroundings is limited (S230), receiving a panoramic image from the cloud server 200 (S240 and S250), and generating an augmented-reality image based on the panoramic image and using the augmented-reality image (S260 and S270).

In more detail, as illustrated in FIG. 6, first, the host vehicle 10 starts autonomous driving (S210). In this case, the host vehicle 10 may perform autonomous driving based on an image captured by the controller 120 from the sensor module 110 and detected position data.

Next, the apparatus 100 collects data (images) of surroundings using the sensor module 110 (S220). In this case, the apparatus 100 may transmit the captured image and the detected position data to the cloud server 200. In this case, the apparatus 100 may also transmit current position data of the host vehicle 10.

Next, the apparatus 100 determines whether the captured image is limited due to another vehicle 10*a* neighboring the host vehicle 10 (S230). That is, the apparatus 100 determines whether currently captured data of the surroundings is limited. In this case, the apparatus 100 may determine whether an image captured by the image sensor 112 or position data detected by the position sensor 114 is limited due to the other vehicle 10*a*.

For example, when a shape of the other vehicle 10*a* is included in the captured image, the apparatus 100 may determine that the image is limited. When the detected position data indicates that there is an object within a short distance from the host vehicle 10, the apparatus 100 may determine that the position data is limited.

When it is determined in S230 that the data of the surroundings is not limited, whether the data of the surroundings is limited may be continuously determined.

When it is determined in S230 that the data of the surroundings is limited, the apparatus 100 requests the cloud server 200 to provide a panoramic image of a corresponding location (S240). Here, the apparatus 100 may request the cloud server 200 to provide the panoramic image when the captured image is limited or when the detected position data is limited.

Next, the apparatus 100 receives the panoramic image of the corresponding location from the cloud server 200 (S250).

Here, the panoramic image transmitted from the cloud server 200 may be generated based on images currently transmitted from the host vehicle 10 and the other vehicle 10*a*. That is, the panoramic image may be generated based on images transmitted from the host vehicle 10 and the other vehicles 10*a* which currently drive through a corresponding location. Alternatively, the panoramic image may be generated based on images that are not limited.

In this case, the panoramic image may include a larger area than those of the images transmitted from the vehicles 10 and 10*a*. For example, the panoramic image may be a combination of a plurality of location-specific images. That is, the panoramic image may be formed by combining three to ten images among the images transmitted from the host vehicle 10.

Next, the apparatus 100 combines the data of the surroundings received from the sensor module 110 and the panoramic image to implement augmented reality (S260). In this case, the apparatus 100 may process the panorama image, which is received from the cloud server 200, in combination with the limited image to generate an augmented-reality image for the limited image.

Here, the apparatus 100 may extract a part of the panoramic image, which corresponds to the current location and is received from the cloud server 200, corresponding to the image captured by the image sensor 112 and use the extracted part as a basic image.

For example, the apparatus 100 may generate an augmented-reality image such that the limited image is combined in a perspective manner based on the panoramic image.

Referring to FIG. 5, the apparatus 100 may generate the augmented-reality image such that the tunnel 1 hidden by the other vehicle 10a is displayed as a solid line and the other vehicle 10a is displayed as a dotted line or transparently.

Next, the apparatus 100 performs autonomous driving according to the augmented-reality image or displays the augmented-reality image (S270). In this case, the apparatus 100 may use the generated augmented-reality image as a currently captured image for autonomous driving. In addition, the apparatus 100 may display the generated augmented-reality image on the display 150.

Figure 7:
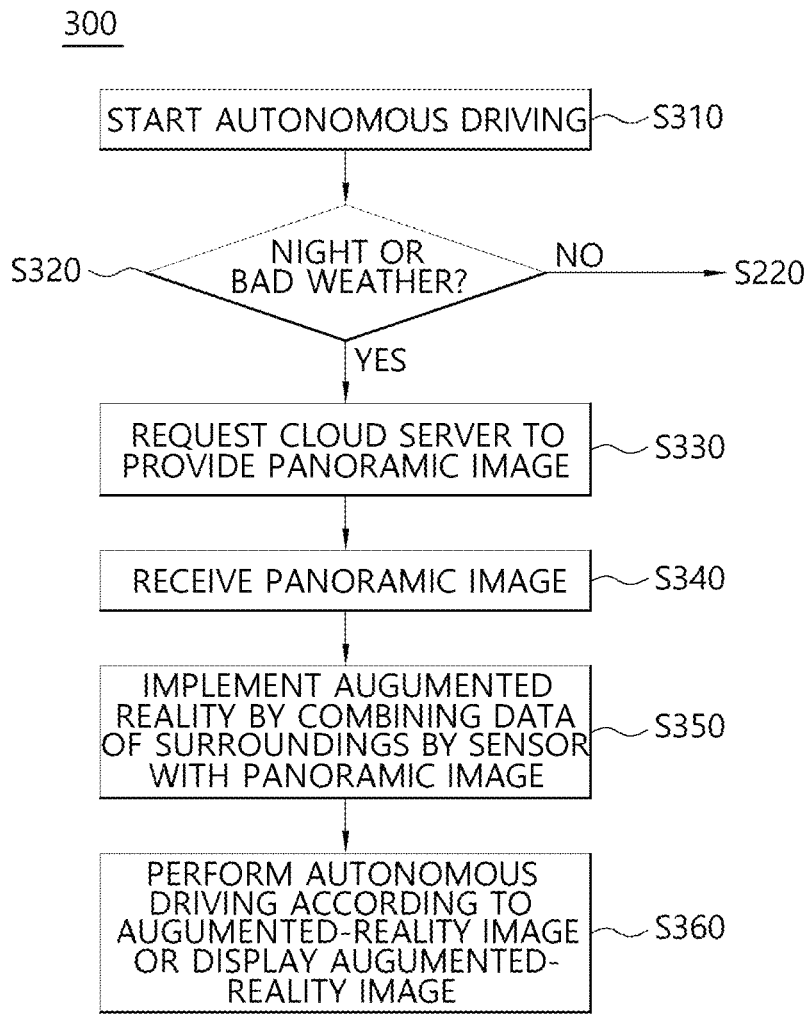
FIG. 7 is a flowchart of another example of a method of assisting driving of a host vehicle based on augmented reality according to an embodiment of the present disclosure.

FIG. 7 is a flowchart of another example of a method of assisting driving of a host vehicle based on augmented reality according to an embodiment of the present disclosure.

A method 300 of assisting driving of a host vehicle based on augmented reality includes starting autonomous driving (S310), determining whether a current condition is night or bad weather (S320), receiving a panoramic image from the cloud server 200 (S330 and S340), and generating an augmented-reality image based on the panoramic image and using the augmented-reality image (S350 and S360).

In more detail, as illustrated in FIG. 7, first, the vehicle 10 starts autonomous driving (S310). In this case, the vehicle 10 may perform autonomous driving based on an image captured by the controller 120 from the sensor module 110 and detected position data.

Next, the apparatus 100 for assisting driving of a host vehicle based on augmented reality determines whether a current condition is night or bad weather (S320). In this case, the apparatus 100 may determine whether the current condition is night or bad weather, based on an captured image.

For example, the apparatus 100 may determine that the current condition is night when the brightness of the image is less than a certain value. In addition, the apparatus 100 may determine that the current condition is bad weather when the definition of the image is less than a certain value due to snow, rain, or fog.

Alternatively, the apparatus 100 may determine whether the current condition is night by using an illumination sensor and determine whether the current condition is bad weather by using components operated in the vehicle 10 during bad weather.

When it is determined in S320 that the current condition is not night or bad weather, the method returns back to S220.

When it is determined in S320 that the current condition is night or bad weather, the apparatus 100 requests the cloud server 200 to provide a panoramic image of a corresponding location (S330).

Next, the apparatus 100 receives the panoramic image of the corresponding location from the cloud server 200 (S340).

Here, the panoramic image transmitted from the cloud server 200 may be generated based on images currently transmitted from the vehicle 10 passing the corresponding location during daytime or on an ordinary day. That is, the panoramic image may be generated based on images transmitted from the vehicle 10 driving through the corresponding location at an earlier point in time. Alternatively, the panoramic image may be generated based on images that are not limited.

Next, the apparatus 100 combines data of surroundings received from the sensor module 110 and the panoramic image to implement augmented reality (S350). In this case, the apparatus 100 may process the panorama image, which is received from the cloud server 200, in combination with the limited image to generate an augmented-reality image for the limited image.

For example, the apparatus 100 may generate an augmented-reality image such that the limited image is combined in a perspective manner based on the panoramic image.

Next, the apparatus 100 performs autonomous driving according to the augmented-reality image or displays the augmented-reality image (S360). In this case, the apparatus 100 may use the generated augmented-reality image as a currently captured image for autonomous driving. In addition, the apparatus 100 may display the generated augmented-reality image on the display 150.

As described above, in the methods of assisting driving of a host vehicle based on augmented reality according to the embodiment of the present disclosure, data limited due to a neighboring vehicle or night or bad weather can be accurately detected, thereby ensuring safe driving.

According to an apparatus for assisting driving of a host vehicle based on augmented reality and a method thereof according to an embodiment of the present disclosure, an augmented-reality image can be generated by receiving a panoramic image of a location through which a vehicle is driving from a cloud sever, which collects data from the vehicle, and combining an captured image with the panoramic image and thus data that is limited due to another vehicle neighboring the vehicle or due to night or bad weather can be accurately detected, thereby ensuring safe driving.

The above methods may be implemented by an apparatus for assisting driving of a host vehicle based on augmented reality as illustrated in FIG. 3, and particularly, by a software program for performing the operations described above. In this case, such programs may be stored in a computer-readable recording medium or transmitted by a computer data signal combined with a carrier wave in a transmission medium or a communication network. In this case, examples of the computer-readable recording medium include all types of recording devices in which data readable by a computer system may be stored.

While embodiments of the present disclosure have been described above, the scope of the present disclosure is not limited thereto, and other embodiments may be easily derived by those of ordinary skill in the art who understand the spirit of the present disclosure by adding, changing, or deleting elements without departing from the scope of the present disclosure.

What is claimed is:

1. An apparatus for assisting driving of a host vehicle based on augmented reality, the apparatus comprising:

an image sensor configured to capture an image of surroundings of the host vehicle; and
a controller communicatively connected to the image sensor and configured to:
transmit the captured image to a cloud server through a wireless communicator;
determine whether information about the captured image is lost due to another vehicle neighboring the host vehicle;
receive a panoramic image of a corresponding location, where the information about the captured image is lost due to the another vehicle, from the cloud server through the wireless communicator, if the information of the captured image is lost, wherein the panoramic image is generated by the cloud server using a plurality of images transmitted from one or more other vehicles;
process the received panoramic image, generated by the cloud server using the plurality of images transmitted from the other vehicles, in combination with the captured image having the lost information to generate an augmented-reality image; and
perform autonomous driving according to the augmented-reality image or display the augmented-reality image on a display.

2. The apparatus of claim 1, further comprising a position sensor configured to detect a position of an object near the host vehicle, and
wherein the controller is further configured to:
transmit detected position data to the cloud server through the wireless communicator;
determine whether information of the detected position data is lost due to the other vehicle; and
request the cloud server to provide the panoramic image of the location through the wireless communicator, if the information of the detected position data is lost.

3. The apparatus of claim 2, wherein the position sensor comprises at least one of a camera sensor, a LiDAR sensor, an ultrasonic sensor, or a radar sensor.

4. The apparatus of claim 1, wherein the image sensor comprises at least one of a camera sensor or a LiDAR sensor.

5. The apparatus of claim 1, wherein the controller is further configured to:
determine whether a current condition is night or bad weather based on the captured image; and
request the cloud server to provide the panoramic image of the location through the wireless communicator, if the current condition is night or bad weather.

6. The apparatus of claim 5, wherein the panoramic image is generated by the cloud server based on images transmitted from the one or more other vehicles passing the location during daytime or on an ordinary day.

7. The apparatus of claim 1, wherein the controller is further configured to generate the augmented-reality image such that the image, the information of which is lost, is combined in a perspective manner based on the panoramic image.

8. The apparatus of claim 1, wherein the panoramic image is generated by the cloud server based on images currently transmitted from the host vehicle and the one or more other vehicles.

9. A method of assisting driving of a host vehicle based on augmented reality, the method comprising:
capturing an image of surroundings of a host vehicle by an image sensor;
transmitting the captured image to a cloud server through a wireless communicator by using a controller of the host vehicle communicatively connected to the image sensor;
determining, by the controller of the host vehicle, whether information about the captured image is lost due to another vehicle neighboring the host vehicle;
receiving, by the controller of the host vehicle, a panoramic image of a corresponding location, where the information about the captured image is lost due to the another vehicle, from the cloud server through the wireless communicator, if the information about the captured image is lost, wherein the panoramic image is generated by the cloud server using a plurality of images transmitted from one or more other vehicles;
processing, by the controller of the host vehicle, the received panoramic image, generated by the cloud server using the plurality of images transmitted from the other vehicles, in combination with the captured image having the lost information to generate an augmented-reality image; and
performing, by the controller of the host vehicle, autonomous driving according to the augmented-reality image or display the augmented-reality image on a display.

10. The method of claim 9, further comprising detecting a position of an object near the host vehicle by a position sensor, and
wherein the transmitting of the captured image comprises transmitting detected position data to the cloud server,
the determining of whether the information about the captured image is lost comprises determining whether information of the detected position data is lost due to the other vehicle, and
if the information of the detected position data is lost, the receiving of the panoramic image comprises requesting the cloud server to provide the panoramic image of the location.

11. The method of claim 10, wherein the position sensor comprises at least one of a camera sensor, a LiDAR sensor, an ultrasonic sensor, or a radar sensor.

12. The method of claim 9, wherein the image sensor comprises at least one of a camera sensor or a LiDAR sensor.

13. The method of claim 9, further comprising:
determining, by the controller, whether a current condition is night or bad weather based on the captured image; and
requesting, by the controller, the cloud server to provide the panoramic image of the location through the wireless communicator, if the current condition is night or bad weather.

14. The method of claim 13, wherein the panoramic image is generated by the cloud server based on images transmitted from the one or more other vehicles passing the location during daytime or on an ordinary day.

15. The method of claim 9, wherein the processing of the received panoramic image comprises generating the augmented-reality image such that the image, the information of which is lost, is combined in a perspective manner based on the panoramic image.

16. The method of claim 9, wherein the panoramic image is generated by the cloud server based on images currently transmitted from the host vehicle and the one or more other vehicles.

17. A non-transitory computer-readable medium storing computer-executable instructions, when executed by a processor, to perform operations of:

capturing an image of surroundings of a host vehicle by an image sensor;
transmitting the captured image to a cloud server through a wireless communicator;
determining whether information about the captured image is lost due to another vehicle neighboring the host vehicle;
receiving a panoramic image of a corresponding location, where the information about the captured image is lost due to the another vehicle, from the cloud server through the wireless communicator, if the information about the captured image is lost, wherein the panoramic image is generated by the cloud server using a plurality of images transmitted from one or more other vehicles;
processing the received panoramic image, generated by the cloud server using the plurality of images transmitted from the other vehicles, in combination with the captured image having the lost information to generate an augmented-reality image; and
performing autonomous driving according to the augmented-reality image or displaying the augmented-reality image on a display.

18. The non-transitory computer-readable medium of claim 17, wherein the operations further comprise detecting a position of an object near the host vehicle by a position sensor;
the operation of transmitting the captured image comprises transmitting detected position data to the cloud server,
the operation of determining of whether the information about the captured image is lost comprises determining whether information of the detected position data is lost due to the other vehicle, and
if the information of the detected position data is lost, the operation of receiving of the panoramic image comprises requesting the cloud server to provide the panoramic image of the location.

19. The non-transitory computer-readable medium of claim 17, wherein the operations further comprise:
determining whether a current condition is night or bad weather based on the captured image; and
requesting the cloud server to provide the panoramic image of the location through the wireless communicator, if the current condition is night or bad weather.

20. The non-transitory computer-readable medium of claim 17, wherein the operation of processing the received panoramic image comprises generating the augmented-reality image such that the image, the information of which is lost, is combined in a perspective manner based on the panoramic image.

* * * * *